No. 643,357. Patented Feb. 13, 1900.
G. W. KELLER.
APPARATUS FOR SETTING RUBBER TIRES.
(Application filed May 8, 1899.)
(No Model.) 4 Sheets—Sheet 1.
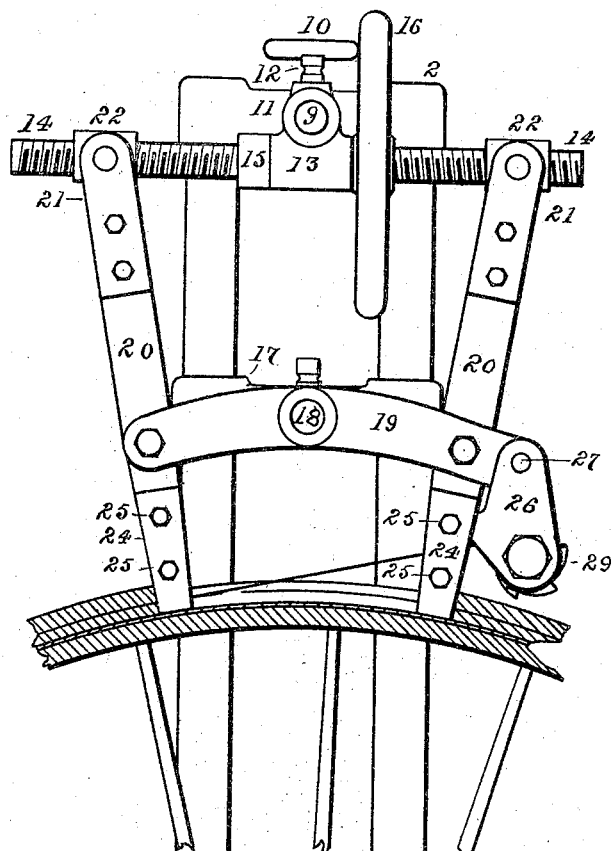
Fig. 1.
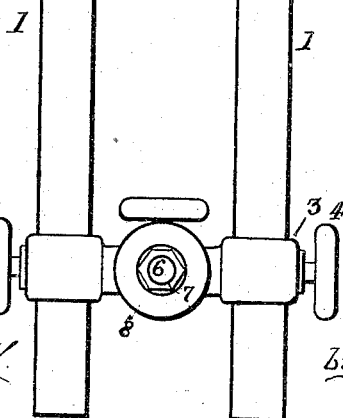
Witnesses:
Grace Brust
Nellie M. Danforth
Inventor:
George W. Keller,
By Humphrey & Humphrey,
Attneys.

No. 643,357. Patented Feb. 13, 1900.
G. W. KELLER.
APPARATUS FOR SETTING RUBBER TIRES.
(Application filed May 8, 1899.)

(No Model.) 4 Sheets—Sheet 2.

Witnesses:
Grace Brust
Nellie M. Danforth.

Inventor:
George W. Keller,
By Humphrey & Humphrey,
Attys.

No. 643,357. Patented Feb. 13, 1900.
G. W. KELLER.
APPARATUS FOR SETTING RUBBER TIRES.
(Application filed May 8, 1899.)

(No Model.) 4 Sheets—Sheet 3.

Witnesses:
Grace Brust
Nellie M. Danforth

Inventor:
George W. Keller,
by Humphrey & Humphrey,
Attorneys

No. 643,357. Patented Feb. 13, 1900.
G. W. KELLER.
APPARATUS FOR SETTING RUBBER TIRES.
(Application filed May 8, 1899.)

(No Model.) 4 Sheets—Sheet 4.

Witnesses:

Inventor:
George W. Keller,
By Humphrey & Humphrey,
Attorneys.

UNITED STATES PATENT OFFICE.

GEORGE W. KELLER, OF AKRON, OHIO, ASSIGNOR OF ONE-HALF TO GRANT U. KIRN, OF SAME PLACE.

APPARATUS FOR SETTING RUBBER TIRES.

SPECIFICATION forming part of Letters Patent No. 643,357, dated February 13, 1900.

Application filed May 8, 1899. Serial No. 715,972. (No model.)

*To all whom it may concern:*

Be it known that I, GEORGE W. KELLER, a citizen of the United States, residing at Akron, in the county of Summit and State of Ohio, have invented a certain new and useful Improvement in Apparatus for Setting Rubber Tires, of which the following is a specification.

My invention has relation to improvements in machines for setting or placing in position solid-rubber tires having a longitudinal strengthening-wire in metallic tires that have a channel in the outer periphery.

The object of my invention is to provide new and improved devices for drawing the wire within the tire tightly about the wheel, while the ends of the rubber tire are held apart to permit the union of the ends of the wire, and for retracting the rubber upon the wire after the union is complete to bring the ends together for cementing.

To the aforesaid objects my invention consists in the peculiar and novel construction, arrangement, and combination of parts hereinafter described and then specifically pointed out in the claims, reference being had to the accompanying drawings, forming a part of this specification.

Figure 2:
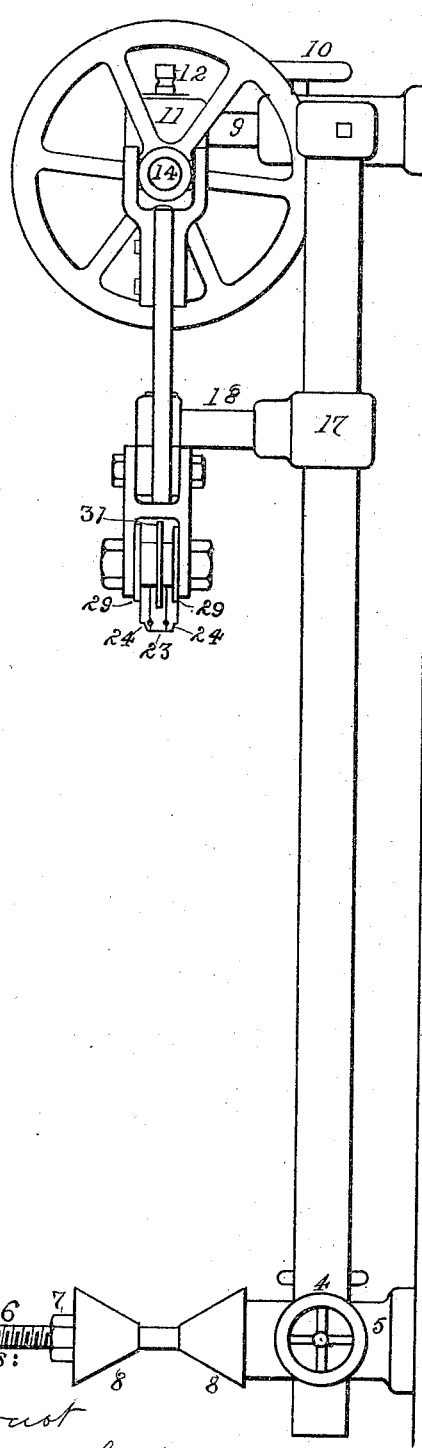
Figure 3:
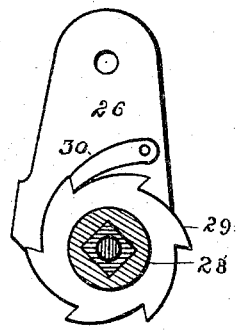
Figure 4:
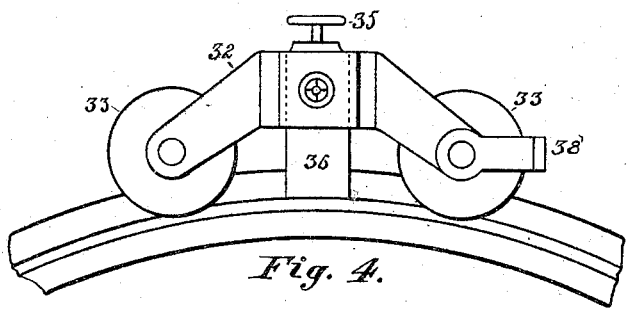
Figure 5:
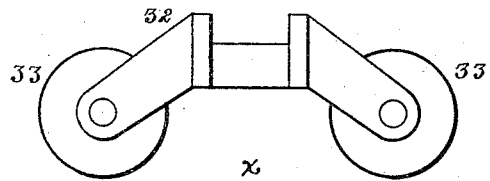
Figure 6:
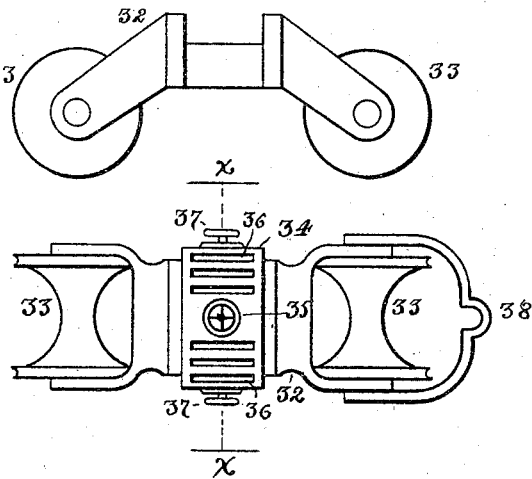
Figure 7:
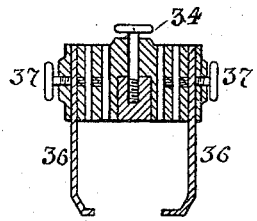
Figure 8:
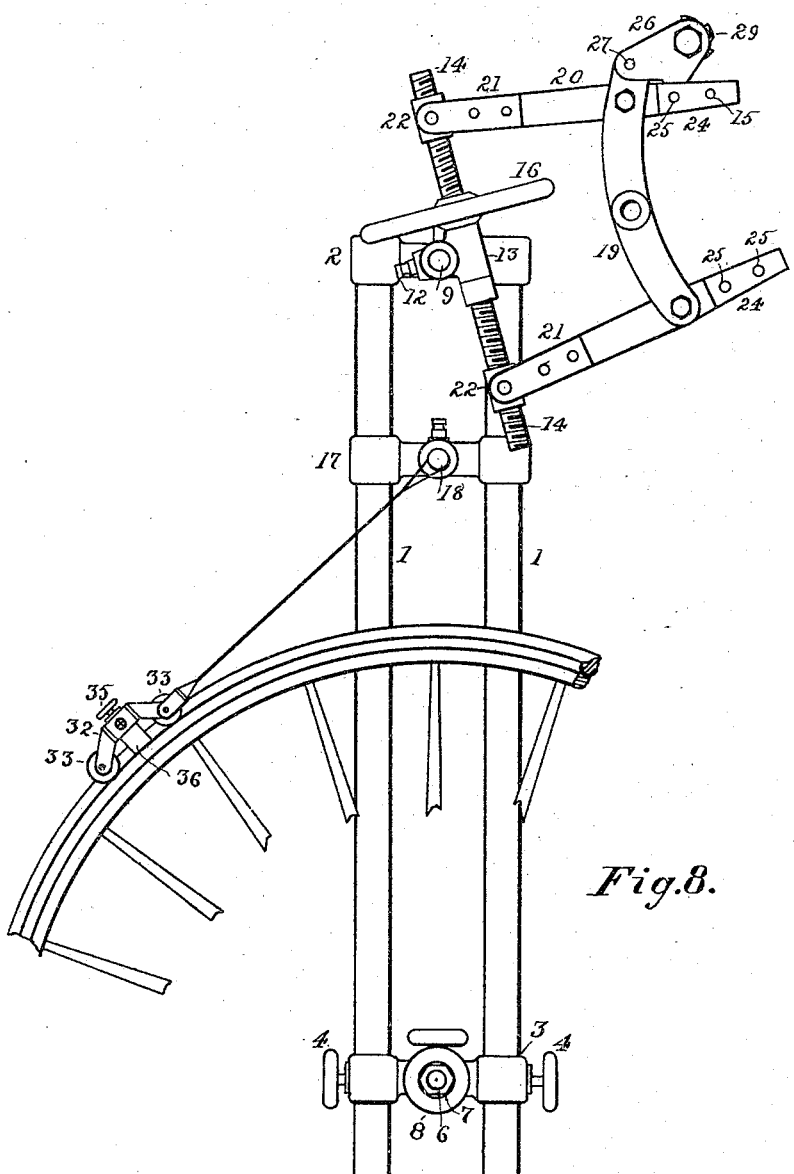

In the accompanying drawings, in which similar reference-numerals indicate like parts in the different views, Figure 1 is a front elevation of my improved tire-setting machine with a portion of a wheel with the metallic and rubber tires therein, the latter shown in section and illustrating the method of drawing the wire tightly; Fig. 2, a side elevation of the same with wheel omitted; Fig. 3, an enlarged detail of the windlass, ratchet, and pawl for drawing the wire; Fig. 4, an elevation of the device for retracting the rubber tire in position on a section of the wheel; Fig. 5, a similar view with the retracting devices removed; Fig. 6, a plan of the same with the retracting devices in position; Fig. 7, a section of the retracting devices at the line $xx$ of Fig. 6, and Fig. 8 is a front elevation with the mechanism in a different position.

Referring to the figures, 1 1 are two parallel rods united at the top by a yoke 2, adapted to be attached to any convenient support, as a wall or post. Near the bottom of these rods is a sliding yoke 3, retained at any desired height by set-screws operated by hand-wheels 4, having a central sleeve 5, adapted to rest against the wall or post, hereinafter referred to. In this sleeve 5 is fastened a horizontal shaft 6, which projects in front of the machine and has its outer end screw-threaded to hold a nut 7, and on this shaft are freely mounted two conical sleeves 8, with their smaller ends in juxtaposition and arranged to enter the opposite ends of the wheel-hub box and suspend it accurately during the process of setting the tire. From the upper yoke 2 there extends to the front a horizontal shaft 9, retained by a set-screw and hand-wheel 10. On the shaft 9 is mounted a sleeve 11, retained by a set-screw 12, integral with which sleeve is a horizontally-transverse sleeve 13, accurately bored to form a bearing for the middle of a shaft 14, with its projecting ends screw-threaded in opposite directions and retained on one side by a tight collar 15 and on the other by a hand-wheel 16. Below the upper yoke 2 is a sliding yoke 17, bearing a wrist or shaft 18, that projects parallel with the shafts 2 and 6, and on which are suspended two parallel curved bars 19, and pivotally mounted between the ends of these bars are two similar levers 20. The upper ends of these levers 20 are forked by means of side pieces 21, and in each fork is pivotally mounted a nut 22, arranged to run on the screw-threaded ends of the shaft 14. The lower ends of the levers 20 are provided with clamping devices to grasp the wire. In the form shown in Fig. 2 these devices are adapted for grasping two wires and consist of a central bar 23 and two side bars 24, retained by bolts 25, the bars 23 and 24 having coincident shallow grooves to form a grip for the wires. Where, however, a single wire is used, the central bar 23 will be omitted.

The windlass for drawing the wire consists of two cheek-pieces 26, pivoted on opposite sides of the projecting ends of the bars 19, and journaled in these pieces is a barrel 28, having on each end a ratchet 29, arranged to be retained by a pawl 30 and adapted to be turned up by a wrench.

When two wires are employed in the tire, a disk or division-plate 31 is placed on the center of the barrel; but where one wire only is used this plate is omitted.

In operation the rubber tire, with the wire or wires within it and their ends projecting, is placed in the channeled tire, and one end of the wire is grasped slightly back of the end by the clamping device nearest the windlass. The other end is carried to the windlass and by it drawn as tightly as may be by that appliance. While so strained, the other clamp is tightened on it and the wire severed between the clamp and windlass at such length as to slightly lap upon the other end. The windlass may then be rocked upward on its pivot out of the way. The hand-wheel 16 is then turned to rock the upper ends of the levers 20 outward until the required degree of tension in the wire is secured. The ends of the wires are then united by brazing or other approved method, the clamps on the bars 20 released, and the wheel lowered by loosening the set-screws 4 4 until the clamps are clear of the wheel and tire. Then the set-screws 4 4 are tightened. In order to place the tightening mechanism out of the way of the next operation, the hand-wheel 10 is loosened and the sleeve 11, bearing the shaft 9, and all the depending parts are drawn forward until the bars 19 are clear of the stud 18 and all swinging parts clear of the parts fastened to the wall. They are then revolved to either side on the shaft 9 as a pivot until sufficiently removed from the tire to enable the operator to readily perform the next step of the process, and then the hand-wheel 10 is tightened, thus supporting the parts to one side without danger of falling down on the wheel and being in the way of the workman. While the wheel still remains mounted on the cones 8, the rubber portion is extended on each side of the joint to bring the ends together over the joint in the wire by the device shown in Figs. 4 to 7. This consists of a frame 32, having forked ends, in which are mounted rollers 33, having a configuration to fit the rubber and grooved edges to run on the flanges of the channeled tire. The central portion of the frame is recessed at each side of the center and at the top. Fitting in this recessed portion is a block 34, retained in position by a screw 35, that enters a corresponding opening in the center of the frame. The block 34 has a number of pairs of openings parallel with the shorter sides, the openings of each pair being equidistant from the center. The position of these openings will be arranged with reference to the varying widths of the channeled metal tires to be used. In the selected pair of these openings are placed two like blades 36, their lower ends curved inward to conform to the channel of the metal tire and retained by set-screws 37. At one end of the frame is pivoted a curved bar or bail 38. The ends of the wire being joined, as hereinbefore stated, the carriage just described is placed on the rubber tire, with the ends of the blades 36 extending into the channeled tire and anchored by means of the bail 38 to any convenient part of the machine. (See Fig. 8.) The wheel is then carefully turned on the cones a part of a revolution in one direction, the blade 36 sliding under the rubber tire. The wheel is then turned in the opposite direction, so as to draw against its anchorage. The result will be that the blade slightly raises the rubber from the channel and the rollers press and urge it toward the joint. This is repeated from each side until the ends of the rubber meet, when they are cemented, the carriage removed, and the completed wheel is then ready to be taken away.

Having thus described my invention, what I claim, and desire to secure by Letters Patent, is—

1. In a rubber-tire-setting machine, the combination with parallel guide-rods having a yoke to connect their upper ends; a sliding yoke bearing a wrist to support the wheel-hub, and means for retaining said sliding yoke of oppositely-disposed rocking levers pivotally mounted on a bar also pivotally mounted on a wrist projecting from an intermediate yoke, said levers having clamps in their lower ends to grasp the tire-wires, and nuts pivotally mounted in their upper ends, a right and left handed screw centrally supported in a sleeve mounted on a wrist extending from said upper yoke, and means for retaining said sleeve, all constructed and arranged substantially as shown and described.

2. In a rubber-tire-setting machine, the combination with parallel guide-rods having a sliding yoke bearing means for sustaining the wheel-hub; an upper yoke bearing a sleeve; a right and left handed screw centrally supported in said sleeve, a wheel to turn said screw; nuts running on said screw pivotally supported in the upper ends of levers, said levers being centrally pivoted in the ends of a bar, pivotally mounted in a wrist extending from an intermediate yoke, and having clamps at their lower ends to grasp the tire-wire, of a windlass mounted on one end of said bar and a ratchet and pawl to retain said windlass, substantially as shown and described.

3. An improved device for bringing the rubber from each direction to the point of union in the channeled tire and along the embedded wires, in tire-setting machines of the kind designated, consisting of a frame having end rollers adapted to run on the metal and rubber tires, and having means for anchoring it against moving with the wheel, and provided with means for securing pairs of blades with curved ends to run under the rubber tire between said rollers, substantially as shown and described.

In testimony that I claim the above I hereunto set my hand.

GEORGE W. KELLER.

In presence of—
C. P. HUMPHREY,
C. E. HUMPHREY.